Dec. 21, 1948.  R. S. CURRY, JR., ET AL  2,456,619
GYROSCOPIC CONTROLLING MEANS
Filed Jan. 19, 1943  2 Sheets-Sheet 2
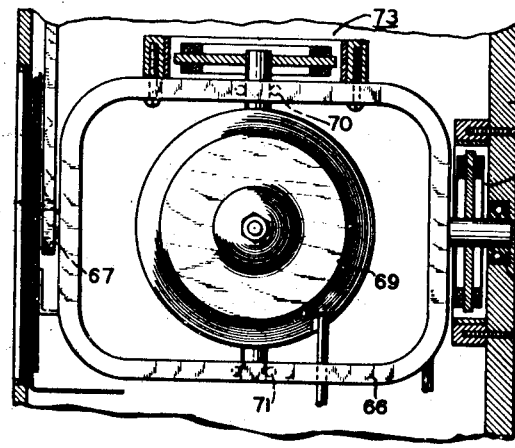
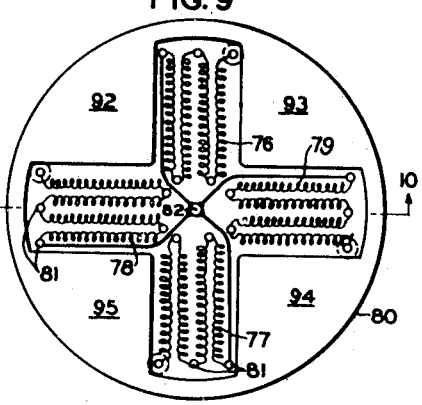
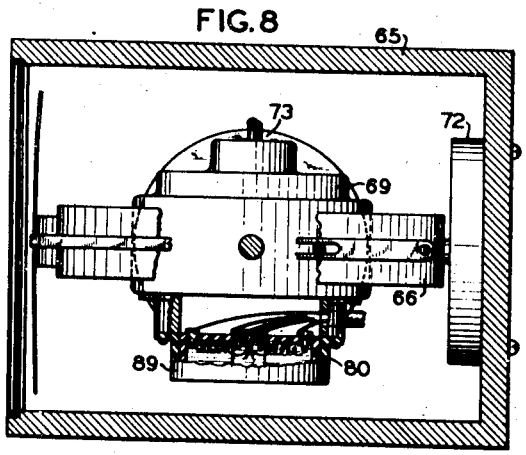
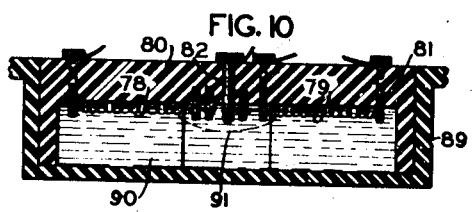
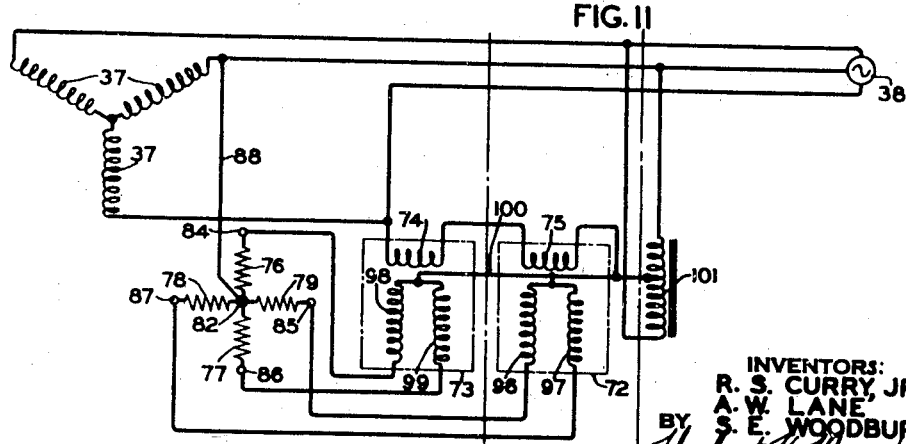
INVENTORS:
R. S. CURRY, JR.
A. W. LANE
S. E. WOODBURY
BY
ATTORNEY Patented Dec. 21, 1948

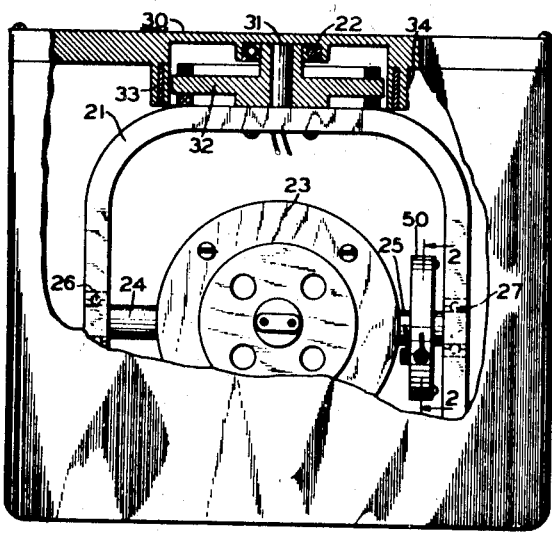

2,456,619

UNITED STATES PATENT OFFICE 2,456,619

GYROSCOPIC CONTROLLING MEANS

Robert S. Curry, Jr., Baldwin, Arthur W. Lane, Freeport, and Stephen E. Woodbury, Mineola, N. Y., assignors to The Sperry Corporation, a corporation of Delaware Application January 19, 1943, Serial No. 472,914

6 Claims. (Cl. 323—75)

This invention relates to an electrothermal pick-off whose output provides an electrical control for a gyroscope or other instrument.

In accordance with the teaching of the invention, one of the parts of the improved pick-off includes two electrically heated resistors located in a heat conducting quiescent fluid. The other of the parts of the pick-off includes a heat non-conducting solid imperforate body of fixed dimensions relative to the two resistors that, in a null position, prevents heat conduction in the fluid of the equal areas of the two heated resistors.

Other features and structural details of the invention will be apparent from the following description when read in relation to the accompanying drawings wherein, Fig. 1 is a side elevation of the directional gyro instrument illustrating the improved pick-off, the casing of the instrument being partly shown in section.

Fig. 2 is an enlarged detail section view taken on line 2—2, Fig. 1.

Fig. 3 is a circuit diagram showing the output circuit of the pick-off as employed in connection with the embodiment of the invention illustrated in Figs. 1 and 2.

Fig. 4 is a detail side elevation of a gyro case and vertical ring as illustrated in Fig. 1 showing a modification of the invention.

Fig. 5 is a detail front elevation of the form of the invention shown in Fig. 4.

Fig. 6 is a circuit diagram showing the output circuit connections of the modification of the invention illustrated in Figs. 4 and 5.

Fig. 7 is a plan view of a gyro vertical instrument showing a further embodiment of the invention.

Fig. 8 is a side elevation of the instrument shown in Fig. 7.

Fig. 9 is an enlarged plan view of the pick-off shown in Figs. 7 and 8.

Fig. 10 is a cross-section taken on line 10—10 in Fig. 9, and

Fig. 11 is a further circuit diagram along the lines of Figs. 3 and 6, for the embodiment of the invention shown in Figs. 7, 8, 9 and 10.

In the forms of the invention shown in Figs. 1 to 6, inclusive, the improved pick-off is shown adapted for use to perform the function of a tilt corrector for the rotor bearing case of a directional gyro instrument. The conventional type of gyro instrument of this character shown in the drawing includes an outer casing 20 in which an azimuth position vertical ring 21 is mounted for pivotal movement about a vertical axis. The upper bearing of the mounting for the ring 21 is indicated at 22. The gyro rotor bearing case 23 is mounted in a suitable manner for pivotal movement about a horizontal axis such as by means of the extending trunnions 24 and 25 and the respective bearings 26 and 27 on the vertical ring 21. This arrangement provides the conventional universal mounting for the case 23, in which the axes of the ring and case are mutually perpendicular.

The gyro rotor (not shown) is contained within the case 23, the rotor being suitably spun by means of a motor (not shown) or driven by other means now known to the art. The spin axis of the rotor is in a plane perpendicular to the plane of the paper as viewed in Fig. 1, the same normally being situated in perpendicular relation to both the axis of the case and the ring.

Electrical means are employed in accordance with the teaching of the present invention for exerting a torque about one of the axes of universal mounting of the gyro rotor bearing case. In this instance, such means exert a torque about the axis of the vertical ring 21, the same being shown in the form of a two-phase squirrel cage induction motor generally indicated at 30. The two-phase wound stator of this motor is fixedly mounted on the upper trunnion 31 of the ring 21, the stator being designated at 32. The rotor 33 of this motor is fixedly mounted in a flange 34 extending from the underside of the top wall of the outer casing of the gyro instrument. The respective windings of the stator are indicated at 35 and 36 in Fig. 3.

In accordance with the showing in Fig. 3, the gyro rotor may be spun by a suitable three-phase motor (not shown) whose windings 37 are supplied with energy from an alternating current source of electrical energy generally indicated at 38. As shown, leads 39, 40 and 41 connect the source with the gyro rotor spinning motor windings 37 which are Y-connected. Winding 36 of the torque motor 39 is continuously energized, being connected across leads 39 and 40. The other of the two-phase reversible torque motor windings or winding 35 in the present instance, is selectively energized by the output of the improved pick-off which determines the direction of application of the torque about the axis of the ring 21.

The resistors of the bridge circuit shown in Fig. 3 are indicated at 42, 43, 44 and 45, the output of the Wheatstone bridge being supplied the winding 35 by way of leads 46 and 47. The input supplied the bridge is fed by way of leads 48 and 49 from the alternating current source 36. The resistances 42, 45 and 43, 44 in the respective branches of the bridge normally balance so that there is no output from the circuit and the torque motor is consequently rendered ineffective. In the form of the invention shown in Figs. 1 to 3, the resistors 42 and 43 of the pick-off include two resistance elements of equal length of the illustrated electrical bridge. The resistors of the pick-off are heated electrically from a source of electrical energy indicated at 38. Further, the resistors 42, 43 are shown in Fig. 2 in a horizontal position even with a heat conducting quiescent fluid or liquid. With displacement from a null position of the parts of the pick-off, one of the resistors moves into the heat conducting quiescent fluid while the other of the resistors moves away from the conducting fluid. In the arrangement shown, the resistors 42 and 43, Fig. 2, are fixedly mounted within an electrically insulated but heat conducting casing 50 which is cylindrical in form. The hollow cylindrical casing 50 is mounted for movement with the case 23 being located as shown in Fig. 1 on the trunnion 25. Casing 50 forms a closed receptacle in which the resistors 42 and 43 are normally positioned in a horizontal plane. The receptacle or casing 50 is filled with a liquid and a fluid or gas of different specific gravity and heat conductivity, the same further preferably being poor conductors of electrical energy. For example, the fluid in the top of the receptacle may be a heat non-conductor, in this instance, such as air while the liquid in the bottom of the receptacle may be a heat conductor such as a light oil. The liquid level of the oil as indicated at 51 within the casing 50 is constant and the resistors 42 and 43 move into and out of the oil upon tilt of the case from a normal position. The resistors 42 and 43 are constructed of wire having a high temperature coefficient of resistance such as "Hytemco" wire. The heat conducting fluid or oil, in this instance, normally dissipates equal amounts of heat from resistors 42 and 43. When angular displacement of the case occurs and the same tilts from a normal position, one or the other of the resistors 42, 43 dips into the liquid which cools the same and by so doing decreases the resistance in that particular branch of the bridge circuit to unbalance the bridge and render the torque motor effective to correct the tilt of the case. The liquid in this form of the invention is enclosed with the casing 50 to provide a heat conducting, quiescent fluid. In accordance with the teaching of the invention each branch of the pick-off may include a heat dissipating resistor. The heat non-conducting body of the pick-off moves with tilt of the case 23 to increase the extent of one of the resistance elements in the heat conducting fluid and correspondingly decrease the extent of the other of the resistance elements in the heat conducting fluid. This changes the internal resistance in the respective resistors to unbalance the bridge and produce the desired controlling output. Resistors 44 and 45 are of constant and equal value.

In the form of the invention shown in Figs. 4, 5 and 6, the resistors are formed by a center tapped single coil of wire of the same material which is mounted on a circular insulating plate 56. Plate 56, like control receptacle 50, is coaxially arranged with respect to the trunnion 25 of the case. In this instance, however, plate 56 is fixedly mounted on the ring 21 by means of hub 58. The heat non-conducting body, in this instance, is a solid shield as designated at 57 that partially encloses equal parts of the resistance wire to either side of the wire's center tap connection. Shield 57 is fixedly mounted on the case 23 and moves with the case as it tilts from a normal position to differentially cover or uncover a greater portion of the resistance wire to one side or the other of the center tap connection. The normal position of the shield and the resistors is shown in Fig. 5. In this instance, the heat conducting fluid is quiescent air the same being of higher heat conductivity than the shield 57.

The resistor branches of the heat radiator shown in this form of the invention are indicated at 58 and 59. The bridge circuit in this instance also includes portions of the winding 35 of the two-phase torque motor, a split phase connection being made from the winding to close the circuit to the source 38. Energy is fed into the bridge circuit from the source by way of lead 60 which is connected to the midpoint in the resistance wires 58—59. In operation of this circuit, if the shield 57, for example, moves clockwise as viewed in Fig. 5 due to tilt of the case 23, it covers more of resistor 59 and less of resistor 58. In resistor 59, less heat is permitted to escape and the resistance due to temperature increase also increases. The resistance in the resistor 58 branch of the circuit decreases correspondingly, the bridge becoming unbalanced and in the example selected permitting more energy to flow through the resistor 58 and right-hand section of the winding 35 as viewed in Fig. 5 than flows through the other branch of the circuit.

The usefulness of the invention in performing the function of an erection controlling means is clearly illustrated in Figs. 7 to 11, inclusive. A conventional type of gyro vertical, as adapted to artificial horizon instruments, is used for illustrative purposes in this connection, the outer casing of the instrument being indicated at 65. Within the casing is mounted a gimbal ring 66 having an axis parallel to the fore and aft axis of the craft in which the instrument is mounted defined by bearings 67 and 68. The gyro rotor bearing case 69 is pivotally mounted on the ring 66 by bearings 70 and 71 which define a rotor case axis situated in an athwartship plane with reference to the craft on which the instrument is employed. Normally the axes of the ring and case lie in a horizontal plane, the case being universally mounted. A torque motor 72 of the character heretofore described is situated in the casing 65 and is effective to exert a torque about the axis of the ring 66 to correct tilt of the case 69 about its athwartship axis. A second torque motor is situated on the ring 66 and is effective to exert a torque about the axis of the case 69 to correct tilt of the ring 66 about its axis. The gyro rotor is contained within the case 69 and may be spun about a normally vertical axis by motive means such as previously described.

As shown in Fig. 11, each of the torque motors 72 and 73, in this instance, are three-phase wound. Winding 74 for motor 73 and winding 75 for motor 72 are series-connected and are continuously energized from the source 38 of alternating current energy employed to drive the rotor spinning motor. Two pair of heat dissipating resistors are employed in the present instance, resistors 76 and 77 being mounted to detect tilt of the ring about its axis, and resistors 78 and 79 being mounted to detect tilt of the case about its axis. As shown in Figs. 8, 9 and 10, the resistors are mounted on an open-ended, inverted, cup-shaped member 80 which is of electrical insulating material. The inwardly disposed face of the member contains a number of posts as designated at 81 to which the ends of the resistors are fastened. One of the posts, located centrally on the member 80, serves as a common terminal for leading energy to the resistors. This post is designated at 82. Four other posts 84, 85, 86 and 87 serve as the end terminals for the respective resistors. Energy is supplied the terminal 82 by way of lead 88.

Member 80 is fixed in position on the bottom of the rotor bearing case 69 by means of the interfitting cup-shaped member 89, the two members forming a receptacle in which a heat conducting liquid 90 that may be similar in character to the liquid employed in connection with the form of the invention shown in Fig. 2. In this instance, liquid 90 fills the receptacle except for a heat non-conducting body in the form of an air bubble or second fluid designated at 91 which travels over the inner flat surface of the member 80 and hence moves in the path of the resistors when the case tilts about either of its axes of universal support. The normal position of the bubble 91 is central and it is shown in this condition in both Figs. 9 and 10. Member 80 is preferably constructed to include solid portions 92, 93, 94 and 95 which form radial channels therebetween that confine the movement of the bubble 91 to movement with respect to the resistors 76, 77, 78 and 79.

The bridge circuit which includes the resistors 78 and 79 also includes the respective windings 96 and 97 of the three-phase torque motor 72. Similarly, the bridge which includes resistors 76 and 77 contains the windings 98 and 99 of the torque motor 73. A common lead 100 for the respective windings 96, 97 and 98, 99 completes the circuit for the respective bridges by way of the auto transformer 101 which may be connected across the alternating current leads supplying energy to the gyro rotor spinning motor. In operation, the windings 96, 97 and 98, 99 of the respective torque motors which are opposingly arranged are ineffective when the respective controlling resistors therefor have equal resistance. If however, for example, the case tilts about the axis of the ring 66, the bubble 91 moves relatively to either resistor 76 or 77 so that the heat conducted from one increases as the other decreases thereby unbalancing the bridge circuit. This consequently controls the operation of torque motor 74 which exerts a torque about the axis of the case 69 in the right direction to precess the ring 66 and return the case to a properly erected position. Erection of the case about its other axis of universal mounting is controlled in a similar manner through means of motor 75.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrothermal pick-off having two relatively displaceable parts, said first part having two electrically heated resistors located in a heat conducting quiescent fluid, and said second part comprising a heat non-conducting imperforate solid body of fixed dimensions relative to the two resistors that in a null position relative to said first part prevents heat conduction in the fluid of equal areas of the two heated resistors.

2. A pick-off as claimed in claim 1, in which the heat conducting fluid is air.

3. A pick-off as claimed in claim 2, in which the heat conducting fluid is oil.

4. An electrothermal pick-off comprising a first part having two electrically heated resistance elements located in a heat conducting quiescent fluid, and a second part comprising a heat non-conducting imperforate solid body movable from a null position relative to said first part to increase the extent of one of the resistance elements in the fluid and correspondingly decrease the extent of the other of the resistance elements in the fluid.

5. An electrothermal pick-off comprising a first part having an electrical bridge with an electrically heated resistor having a center tap in a heat conducting quiescent fluid, and a second part movable relative to said first part comprising a heat loss reducing imperforate sheet that in a null position relative to the first part lessens heat loss to the fluid of equal areas of the resistors on the respective sides of the center tap.

6. In the combination set forth in claim 5, said second part being movable from a null position relative to said first part to increase the length of one of said resistors in the fluid and correspondingly decrease the length of the other of the resistors in the fluid.

ROBERT S. CURRY, JR.
ARTHUR W. LANE.
STEPHEN E. WOODBURY.

REFERENCES CITED

The following references are of record in the file of this patent:

UNITED STATES PATENTS

| Number | Name | Date |
|---|---|---|
| 842,314 | Heeley et al. | Jan. 29, 1907 |
| 1,125,233 | Whipple | Jan. 19, 1915 |
| 1,136,566 | Usener | Apr. 20, 1915 |
| 1,228,061 | Schuler | May 29, 1917 |
| 1,664,250 | Eynon | Mar. 27, 1928 |
| 1,812,722 | Spencer | June 30, 1931 |
| 1,944,721 | Sell | Jan. 23, 1934 |
| 2,025,898 | Rhodes | Dec. 31, 1935 |
| 2,076,499 | Grant | Apr. 6, 1937 |
| 2,205,306 | Olshevsky | June 18, 1940 |
| 2,237,077 | Lauck | Apr. 1, 1941 |
| 2,278,379 | Koster | Mar. 31, 1942 |

FOREIGN PATENTS

| Number | Country | Date |
|---|---|---|
| 361,204 | Italy | July 15, 1938 |
| 382,099 | Germany | Sept. 28, 1923 |
| 448,836 | Germany | Aug. 30, 1927 |

Certificate of Correction

Patent No. 2,456,619. December 21, 1948.

ROBERT S. CURRY, JR., ET AL.

It is hereby certified that errors appear in the printed specification of the above numbered patent requiring correction as follows:

Column 2, line 43, for "motor 39" read *motor 30*; column 6, line 28, claim 5, after the word "part" second occurrence, insert *and*;

and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*